United States Patent
Martin

(10) Patent No.: US 7,123,704 B2
(45) Date of Patent: *Oct. 17, 2006

(54) 3-WAY CALL DETECTION SYSTEM

(75) Inventor: Thomas Martin, State College, PA (US)

(73) Assignee: Inmate Telephone, Inc., Altoona, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 11/035,071

(22) Filed: Jan. 14, 2005

(65) Prior Publication Data

US 2005/0111654 A1    May 26, 2005

Related U.S. Application Data

(63) Continuation of application No. 10/291,659, filed on Nov. 12, 2002, now Pat. No. 6,895,086.

(60) Provisional application No. 60/331,258, filed on Nov. 13, 2001.

(51) Int. Cl.
*H04M 3/00* (2006.01)
(52) U.S. Cl. ............. 379/189; 379/406.14; 379/207.01
(58) Field of Classification Search ................ 379/189, 379/406.01, 207.01, 406.14
See application file for complete search history.

(56) References Cited

U.S. PATENT DOCUMENTS 4,670,628 A    6/1987    Boratgis et al.

(Continued)

FOREIGN PATENT DOCUMENTS

GB    2 075 313    11/1981

(Continued)

OTHER PUBLICATIONS

Coherent Announces Industry's First Remote Management System for Echo Canceller, Business Wire, Mar. 3, 1997.

(Continued)

*Primary Examiner*—Jefferey F. Harold
(74) *Attorney, Agent, or Firm*—Wiley Rein & Fielding LLP

(57) ABSTRACT

Disclosed herein is a three-way call detection system and method for detecting the addition of a third party to a pre-existing telephonic connection between a first party and a second party. The system comprises: a meter for measuring the amplitude of a line voltage of a telephonic connection between a first party and a second party, said line voltage having a frequency band F1; a first filter to remove a frequency band F2 from said line voltage and output a filtered signal, said frequency band F2 being a subset of F1; a white noise generator for generating a low level white noise signal with a frequency band that corresponds to F2 and with an amplitude that is significantly below an amplitude level of the measured line voltage for frequency band F2; a coupler for combining the low level white noise signal to the filtered signal, thereby outputting an additive line voltage; a second filter that passes only a portion of the additive line voltage, said signal that passes being referred to as the band-passed signal, said band-passed signal having a frequency range F3, said frequency band F3 being a subset of F1 and being inclusive of F2; and a processor for processing the band-passed signal and determining a baseline amplitude level associated with a two-way call. The processor monitors the band-passed signal in the time domain for a shift in baseline amplitude level, which shift is associated with the addition of a third party to the telephonic connection. The white noise being added is preferably at least 3 dB below the amplitude level of the measured line voltage, more preferably at least 10 dB, more preferably at least 20 db, and most preferably 40 db below. The frequency band F2 is selected from F1 to be significantly large enough to permit more reliable detection, and yet small enough to be barely perceptible to the listener. For example, F2 may comprise the frequencies from 1–2 KHz. An F2 of 1–1.3 KHz. also functions well.

20 Claims, 6 Drawing Sheets

Agere Systems T8532 Codec Block Diagram

U.S. PATENT DOCUMENTS

| | | |
|---|---|---|
| 4,691,347 A | 9/1987 | Stanley et al. |
| 4,737,982 A | 4/1988 | Boratgis et al. |
| 4,813,070 A | 3/1989 | Humphreys et al. |
| 4,907,221 A | 3/1990 | Pariani et al. |
| 4,918,719 A | 4/1990 | Daudelin |
| 4,995,030 A | 2/1991 | Helf |
| 5,291,548 A | 3/1994 | Tsumura et al. |
| 5,319,702 A | 6/1994 | Kitchin et al. |
| 5,345,595 A | 9/1994 | Johnson et al. |
| 5,425,091 A | 6/1995 | Josephs |
| 5,438,616 A | 8/1995 | Peoples |
| 5,502,762 A | 3/1996 | Andrew et al. |
| 5,535,194 A | 7/1996 | Ashley et al. |
| 5,535,261 A | 7/1996 | Brown et al. |
| 5,539,731 A | 7/1996 | Haneda et al. |
| 5,555,551 A | 9/1996 | Rudokas et al. |
| 5,590,171 A | 12/1996 | Howe |
| 5,592,548 A | 1/1997 | Sih |
| 5,745,558 A | 4/1998 | Richardson, Jr. et al. |
| 5,748,726 A | 5/1998 | Unno |
| 5,757,889 A | 5/1998 | Ohtake |
| 5,796,811 A | 8/1998 | McFarlen |
| 5,805,685 A | 9/1998 | McFarlen |
| 5,835,486 A | 11/1998 | Davis et al. |
| 5,867,562 A | 2/1999 | Scherer |
| 5,883,945 A | 3/1999 | Richardson, Jr. et al. |
| 5,907,602 A | 5/1999 | Peel et al. |
| 5,920,834 A | 7/1999 | Sih et al. |
| 5,926,533 A | 7/1999 | Gainsboro |
| 5,999,828 A | 12/1999 | Sih et al. |
| 6,035,034 A | 3/2000 | Trump |
| 6,052,462 A | 4/2000 | Lu |
| 6,072,860 A | 6/2000 | Kek et al. |
| 6,078,567 A | 6/2000 | Traill et al. |
| 6,078,645 A | 6/2000 | Cai et al. |
| 6,141,406 A * | 10/2000 | Johnson ..................... 379/189 |
| 6,185,416 B1 | 2/2001 | Rudokas et al. |
| 6,763,099 B1 * | 7/2004 | Blink ..................... 379/189 |

FOREIGN PATENT DOCUMENTS

| | | |
|---|---|---|
| JP | 59225626 | 12/1984 |
| JP | 60010821 | 1/1985 |
| JP | 61135239 | 6/1986 |
| JP | 3065826 | 3/1991 |
| WO | PCT/US9514230 | 11/1995 |

OTHER PUBLICATIONS

Audioconferencing options. (Teleconference Units, Conference Bridges and Sevice Bureaus) (includes related articles on speech processing and new conferencing technology), Frankel, Elana, Teleconnect, v 14, n 5, p. 131(3), May 1996.

Digital on Call, Silberg, Lurie, HFN The Weekly Newspaper for the Home Furnishing Network, p. 97, Mar. 17, 1997.

Inmate Telephone Services: Large Business: Voice, Oct. 2, 2001.

* cited by examiner

Figure 1 - Agere Systems T8532 Codec Block Diagram

Figure 2 - Agere Systems T8535B Codec Block Diagram

Figure 3 - DSP Algorithm Equipment Setup

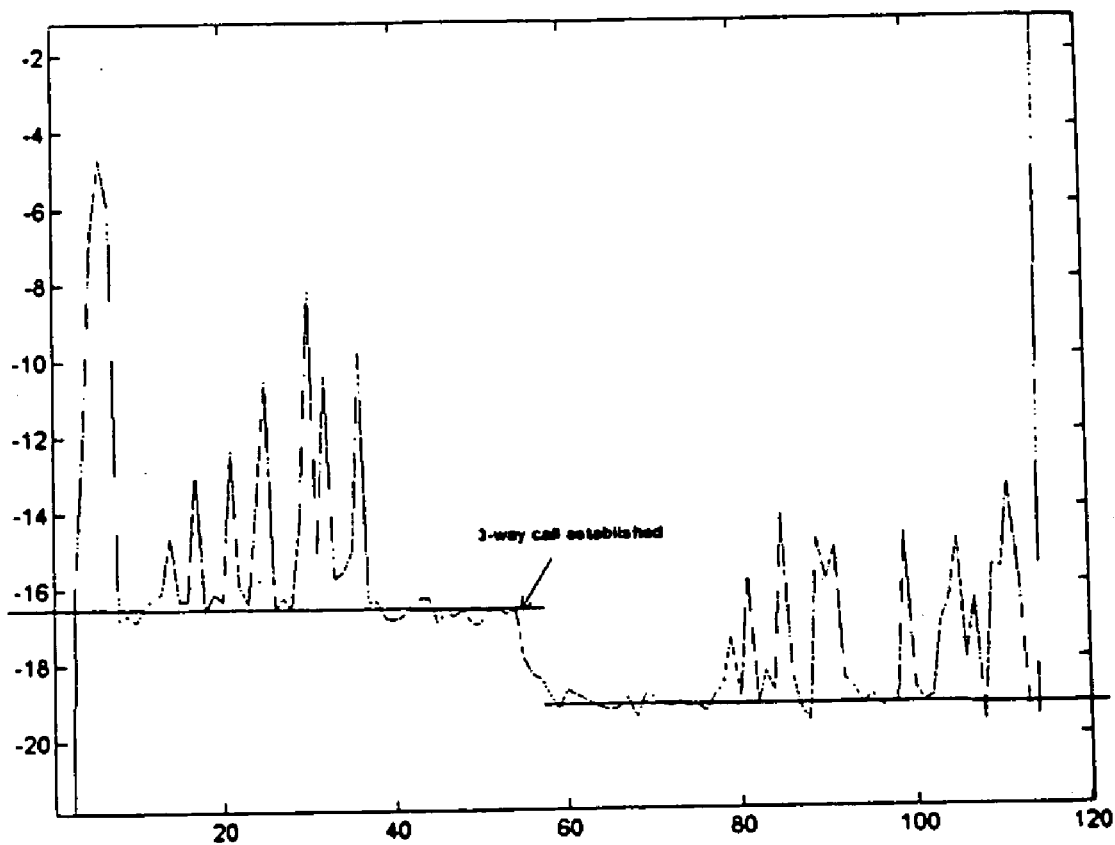
Figure 5 Signal levels in the 1 kHz - 2 kHz band

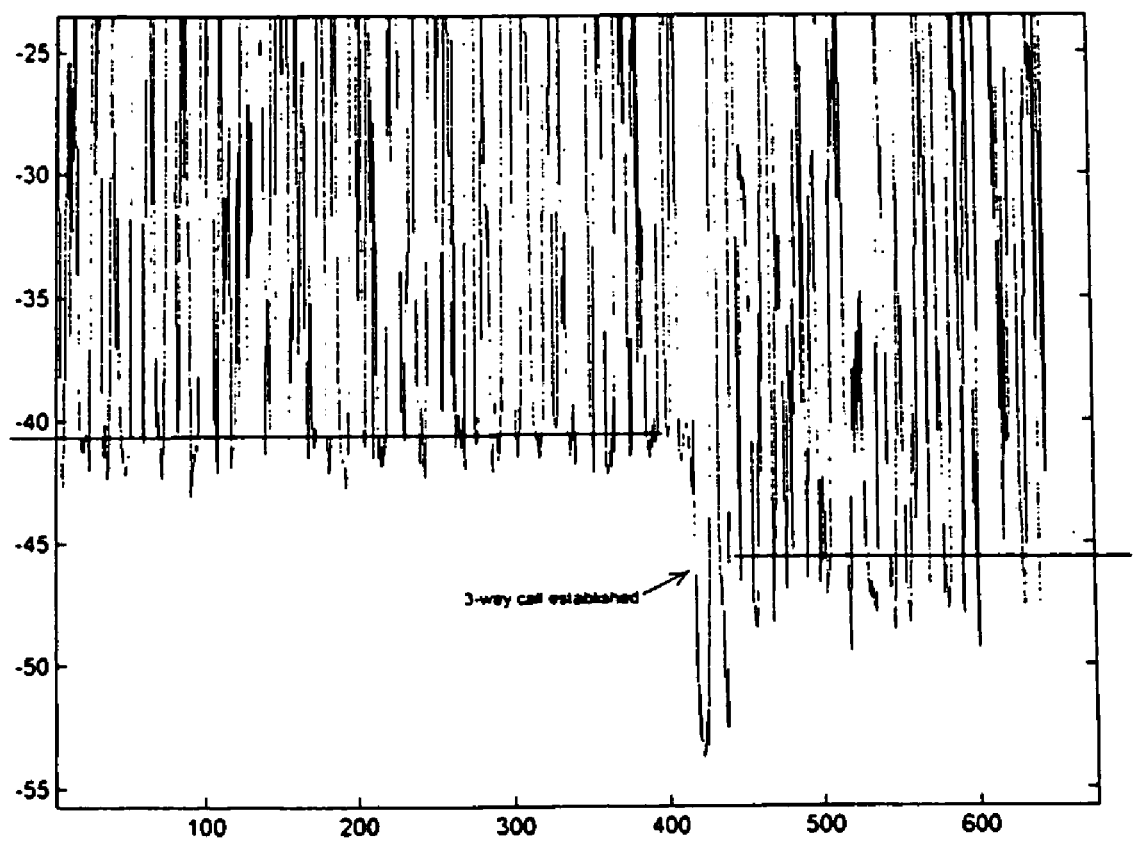
Figure 6. Signal levels (white noise) 1 kHz - 1.3 kHz band

3-WAY CALL DETECTION SYSTEM

RELATED APPLICATIONS

This application claims priority to U.S. Provisional Application No. 60/331,258, filed Nov. 13, 2001, and U.S. application Ser. No. 10/291,659 filed Nov. 12, 2002 now U.S. Pat. No. 6,895,086, which are incorporated by reference in their entirety.

FIELD OF INVENTION

This invention relates generally to telephony, and more particularly to a method and a system for detecting when a party has been added to a pre-existing telephone call.

BACKGROUND OF INVENTION

Generally, there is a need for systems that detect three way calls. There is a great need for such systems in telephone systems for jails, prisons, and other correctional institutes, where the calls of inmates are closed monitored for unauthorized activity.

Conventional systems exist for detecting three way calls, but such conventional systems do not reliably and accurately detect when new parties have been added to an existing call. Accordingly, a need exists for improved three way call detection methods and systems.

SUMMARY OF THE INVENTION

Particular implementations of the present invention, which have yielded reliable and accurate three-way call detection systems and methods, will now be described. These present inventions use computers and software to create efficiencies and improve reliability of three-way call detection.

Disclosed herein is a method of detecting the addition of a third party to an pre-existing telephonic connection between a first party and a second party. The method comprises the steps of: measuring a line voltage for amplitude, said measured line voltage having a frequency band F1; filtering the measured line voltage to remove a frequency band F2 to create a filtered signal, said frequency band F2 being a subset of frequency band F1; generating a low level white noise signal with a frequency band that corresponds to F2 and with an amplitude that is significantly below an amplitude level of the measured line voltage for frequency band F2; adding the low level white noise signal to the filtered signal to create an additive line voltage; filtering the additive line voltage to pass only a portion of the additive line voltage, said signal that passes being referred to as the band-passed signal, said band-passed signal having a frequency range F3, said frequency band F3 being a subset of F1 and being inclusive of F2; processing the band-passed signal to determine a baseline amplitude level associated with the characteristics of a two-way call; monitoring the band-passed signal in the time domain for a shift in baseline amplitude level, which shift is associated with the addition of a third party to the previous two-party call. The white noise being added is preferably at least 3 dB below the amplitude level of the measured line voltage, more preferably at least 10 dB, more preferably at least 20 db, and most preferably 40 db below. The frequency band F2 is selected from F1 to be significantly large enough to permit more reliable detection, and yet small enough to be barely perceptible to the listener. For example, F2 may comprise the frequencies from 1–2 KHz. An F2 of 1–1.3 KHz. also functions well.

Also disclosed herein is a three way call detection system for detecting the addition of a third party to an pre-existing telephonic connection between a first party and a second party. The system comprises: a meter for measuring the amplitude of a line voltage of a telephonic connection between a first party and a second party, said line voltage having a frequency band F1; a first filter to remove a frequency band F2 from said line voltage and output a filtered signal, said frequency band F2 being a subset of F1; a white noise generator for generating a low level white noise signal with a frequency band that corresponds to F2 and with an amplitude that is significantly below an amplitude level of the measured line voltage for frequency band F2; a coupler for combining the low level white noise signal to the filtered signal, thereby outputting an additive line voltage; a second filter that passes only a portion of the additive line voltage, said signal that passes being referred to as the band-passed signal, said band-passed signal having a frequency range F3, said frequency band F3 being a subset of F1 and being inclusive of F2; and a processor for processing the band-passed signal and determining a baseline amplitude level associated with a two-way call. The processor monitors the band-passed signal in the time domain for a shift in baseline amplitude level, which shift is associated with the addition of a third party to the telephonic connection. The white noise being added is preferably at least 3 dB below the amplitude level of the measured line voltage, more preferably at least 10 dB, more preferably at least 20 db, and most preferably 40 db below. The frequency band F2 is selected from F1 to be significantly large enough to permit more reliable detection, and yet small enough to be barely perceptible to the listener. For example, F2 may comprise the frequencies from 1–2 KHz. An F2 of 1–1.3 KHz. also functions well.

The present invention overcomes the problems and disadvantages associated with conventional methods and systems, and provides improved systems and methods whereby the additions of new parties to a telephone call may be detected.

Other embodiments and advantages of the invention are set forth in part in the description that follows, and in part, will be obvious from this description, or may be learned from the practice of the invention.

BRIEF DESCRIPTION OF THE DRAWINGS

For a more complete understanding of the invention and some advantages thereof, reference is now made to the following descriptions taken in connection with the accompanying drawings in which:

FIG. 5 is an amplitude vs. time plot that shows how a three way call may be detected in one embodiment of the present invention.

FIG. 6 is an amplitude vs. time plot, which shows how a three-way call may be detected in another embodiment of the present invention.

DETAILED DESCRIPTION OF THE INVENTION

Figure 1:
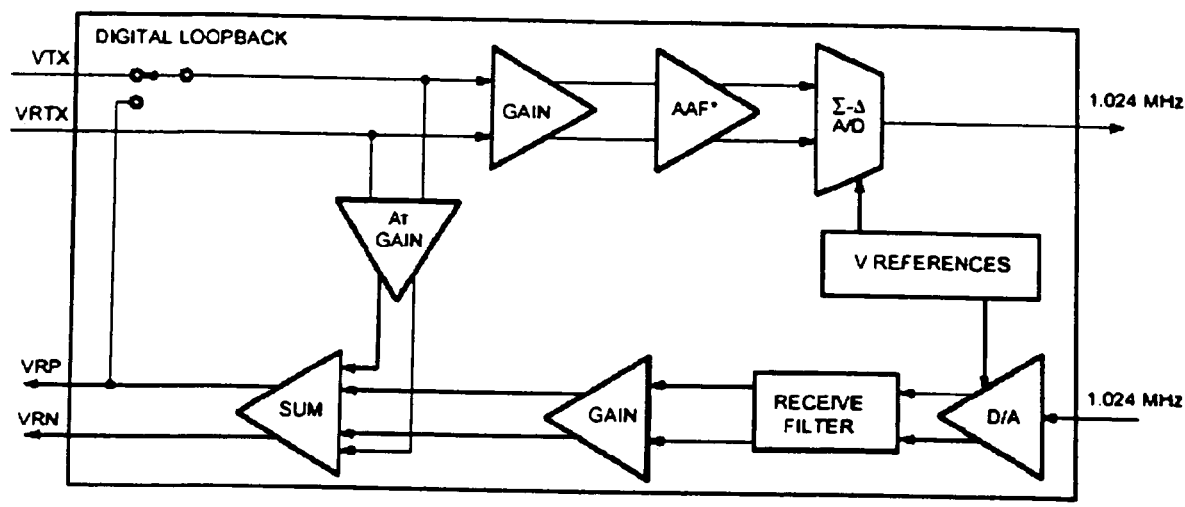
FIG. 1 is the block diagram for an type of codec chip that is used in some phone systems

The following is a sequence of events that may occur when a caller adds a third-party call using a 3-way calling service.

1. First, the prisoner (or similar person) may call a telephone number that is not blocked or otherwise restricted. The recipient of the call answers the phone.

2. Once the initial call is established, a communication path with fairly constant electrical characteristics is formed.

3. At some point, the party that has been called (and who is not subject to the correctional institutes calling restrictions) decides to add a third party. The called party may use a hook flash sequence to put the caller on hold or he/she may have a more modern phone or PBX that does not use a hook flash. Even in the latter case of no hook flash, one or more periods of silence will occur, along with a release pulse, when the 3-way call becomes active.

4. Once the 3-way call is established, since another section of phone line has effectively been added to the circuit, the characteristics of the overall noise level have changed, which can be detected by the present invention.

A technical advantage of the present invention is that it may be used to significantly reduce the number of unauthorized calls that go undetected by conventional systems.

Another technical advantage is that the present invention may be used to more closely monitor for unauthorized uses of inmate telephone systems.

Another technical advantage of the present invention is that it may be easily adjusted for any given telephone system with which it is installed for improved three-way call detection.

Many people in the US have a telephone that's part of what called the 'POTS' network, or the Plain Old Telephone System. This system consists of pairs of wires that carry analog telephone signals along with DC power to and from customers and one of many Central Offices (COs) all over the country. Other people have new, modern digital phones or fiber optics connecting their houses with the Central Offices as well. So, when a call is placed across town, or across the country, the paths which sound must travel often cross a plurality of different systems, different connections, and different mediums. Each such system, connection and medium result in mismatches in impedance as well as the introduction of noise. These mismatches result in echos that add noise and degrade call quality. With the addition of each new party to a telephone call, the result is an increase in echos, noise and signal degradation.

Another cause of echoes that appear on three-way calls has to do with the imperfect electrical characteristics of what's called a 'two-wire-to-four wire hybrid' or simply a 'hybrid' present at each POTS telephone. POTS phone lines consist of only two wires, and these wires carry incoming signals (what we hear on the phone), outgoing signals (what we say on the phone) and DC power. Remember that our telephones have two wires for a microphone and two wires for a speaker, for a total of four. Accordingly, such phones must include a 'two-wire-to-four wire hybrid' circuit to process the electric connection between a POTS phone line (the 2-wire side) and a microphone/speaker pair (on the 4-wire side). For a more detailed discussion of echos that occur in connection with three-way calls and echo cancellers that are used to remove such echos, see U.S. Pat. Nos. 5,535,194, and 6,035,034, which patents are hereby incorporated by reference in their entireties.

To send a spoken message out onto the phone line, the hybrid must place the signal on the phone line, and at the same time, the hybrid must also retrieve an incoming signal and pass it through the hybrid to the speaker. For a number of reasons (including, for example, imperfect transformers) a portion of the spoken speech gets passed through the hybrid, onto the phone line, back off the phone line, back into the hybrid and sent to the speaker. The result is an echo, one that we usually don't notice because it's barely delayed in time from our own speech. Our brains unconsciously filter this echo.

When a long-distance call is placed, the outgoing speech goes over the phone line to the called party, and due to the mismatches along the way, a small portion of it comes back over the line from the called-party's hybrid and results in an echo on the originating side. Only this time, there may be a considerable time delay due to the round-trip travel of the signal, so these echoes can be very noticeable. Calling Europe, for example, can result in very long, annoying echoes.

During three-way phone calls, a similar effect happens. Assume speaker A is an original caller who makes a call to Speaker B; and while on the line, either A or B then makes a three-way call to Speaker C who then joins the call as a third-party. The signal from speaker A goes both to speaker B and speaker C, so the overall signal travel time is longer than when speaker A just calls speaker B or C alone. Furthermore, the signals from the other callers (B and C in this case) are traveling and reflecting back from the other callers so that all three parties potentially hear echoes. As the distance between callers increases, the echoes may become more noticeable. In addition, the ability of the hybrid circuits to function properly on either end of a connection directly affects the perceptibility of such echoes.

The phone companies, in their attempts to produce very good-quality phone calls, have circuitry built in to their systems that detect and remove echoes. This circuitry implements a number of electronic functions in an attempt to reduce echoes.

FIG. 1 below is the block diagram for an example chip that's used in some phone systems as part of the Central Office circuitry. This part is called a 'codec', and is a fundamental circuit in the phone system, as every POTS line has one. In particular, FIG. 1 is a block diagram for Agere Systems T8532 Codec.

The signals on the left side of the diagram represent those on the POTS phone line; the signals on the right side represent the signals within a digital Central Office. VTX/VTRX represent signals coming into the CO which are spoken by a speaker; VRP/VRN represent signals going out from a CO to a customer (the signals that one hears on a phone call).

Notice the various blocks marked 'Gain'. Gain means a change in amplitude, either making the signal louder or softer, depending on what's needed at the time. A principal use of the Gain blocks is to maintain reasonable volume levels for all calls passed though a codec. Much more signal amplitude (volume) will have to added to a call that's made over 100 miles of POTS wiring than one that's made over 10 miles of POTS wiring. The Gain of phone calls is handled automatically by the phone system so we don't realize all this is actually happening.

Figure 2:
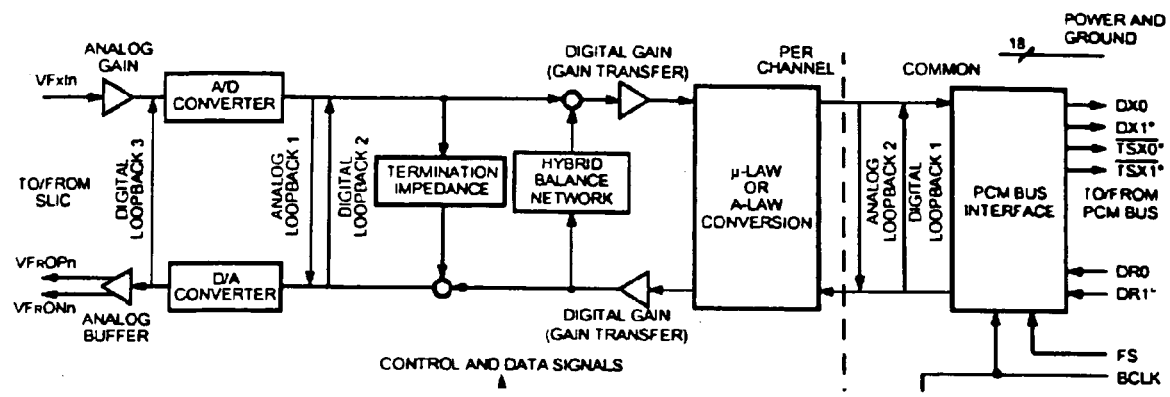
FIG. 2 is the block diagram for a more modern codec chip.

FIG. 2 below is the block diagram for another, more modern codec, namely, the Agere Systems T8535B Codec. As with FIG. 1, the signals on the left side of the diagram represent those going to and from a POTS phone line, and those on the right are the signals inside a digital Central Office. The VfxIn are signals coming from a caller into the CO; VfxOPn/Onn are signals going out of a CO to a customer. In this diagram that there are two very important blocks—one marked 'Termination Impedance' and the one marked 'Hybrid Balance Network'.

These two blocks taken together form an electronic version of a hybrid circuit, one with electrical characteristics far superior to old-time transformer-based hybrids. The two triangular blocks marked 'Digital Gain' provide gain functions similar to those shown in FIG. 1. They increase or decrease signal volume as needed.

Now that a general description of the overall phone systems has been provided, the particulars of the present invention can be better appreciated.

It is known that phone systems monitor the signals on phone lines and adjusts their amplitudes (volumes) continually in an effort to provide the best possible call quality. The ability of a phone system to monitor and adjust amplitudes varies from system to system and from path to path. The ability to make adjustments is further complicated because older phone line circuits have transformer-based hybrid circuits while newer ones tend to have electronic hybrids. Accordingly, phone systems have to constantly make adjustments based on the interaction of new and old systems.

When three-way calls are established, echoes are created due to the hybrid circuits and due to new signal paths being added to the mix. Because of these changes, phone company circuits must detect these echoes and try to cancel them using a number of techniques. These techniques are designed to improve the overall quality of the call.

Because the addition of parties to a preexisting phone call results in the phone companies making adjustments to the line volume on the call, one can monitor the line volume for such adjustments in an effort to detect a three way call. The challenge is to design a detection technique that is reliable and accurate. Reliability and accuracy are complicated by the fact that any given phone call can have a path across any number of different phone systems and different kinds of circuitry.

The techniques employed by the present invention have achieved an unexpected result, namely, a much improved level of accuracy and reliability.

Figure 3:
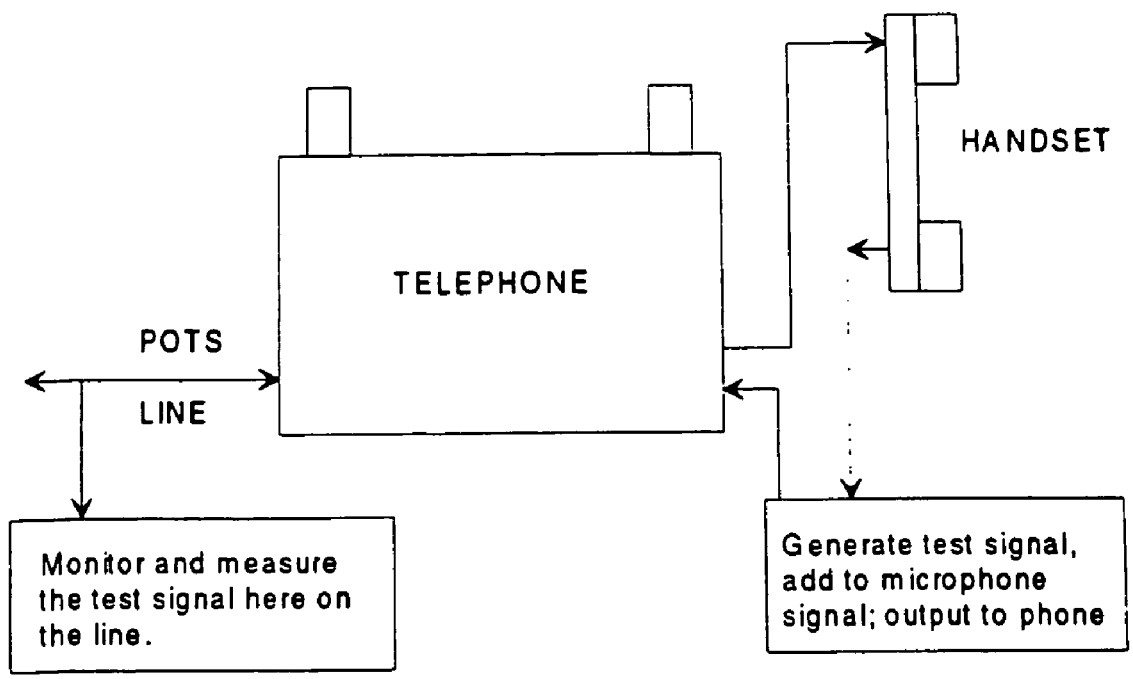
FIG. 3 is a block diagram for a system set up that monitors for three-way calls.

FIG. 3 shows a block diagram of a setup for one embodiment of the present invention.

The following is a detailed description of the steps involved in the three-way call detection shown in FIG. 3:

The microphone signal coming from a telephone handset is received.

Its amplitude is adjusted as needed for a decent call.

A certain block of frequencies is filtered out of the received speech to prevent higher and lower signal amplitudes in the given frequencies from falsely triggering the three-way call detector.

In the frequency bands that were filtered out, spectral bins constituting random noise are added to the received and filtered speech. The amplitude of the random noise is carefully generated and held constant. The new speech+noise signal is then passed to the phone to go through the hybrid and get passed out onto the phone line.

The signal out on the phone line is measured and the signal levels in the frequency bands of the test signal are measured and compared to what was sent. Their relative amplitudes in decibels are calculated.

This process happens continually, and whenever a three-way call of sufficient characteristics happens, the phone company adjusts the gain of the signals on the line and/or the line impedance, and that difference can be measured. Since the test signal put out on the line has constant volume, a non-three-way call will settle out in a few seconds such that the amplitude of the test signal on the line is also constant. Three-way calls have the gain of the signals on the line decreased, as discussed earlier, and thus the test signal's amplitude will be lower and can be measured.

It may be sufficient to simply measure the amplitude of the speech received from the microphone and compare this to the amplitude of the same speech on the line, but detection is very tough when the original caller doesn't speak, since outgoing signal amplitude will be extremely low. The addition of the test signal solves this problem.

Figure 4:
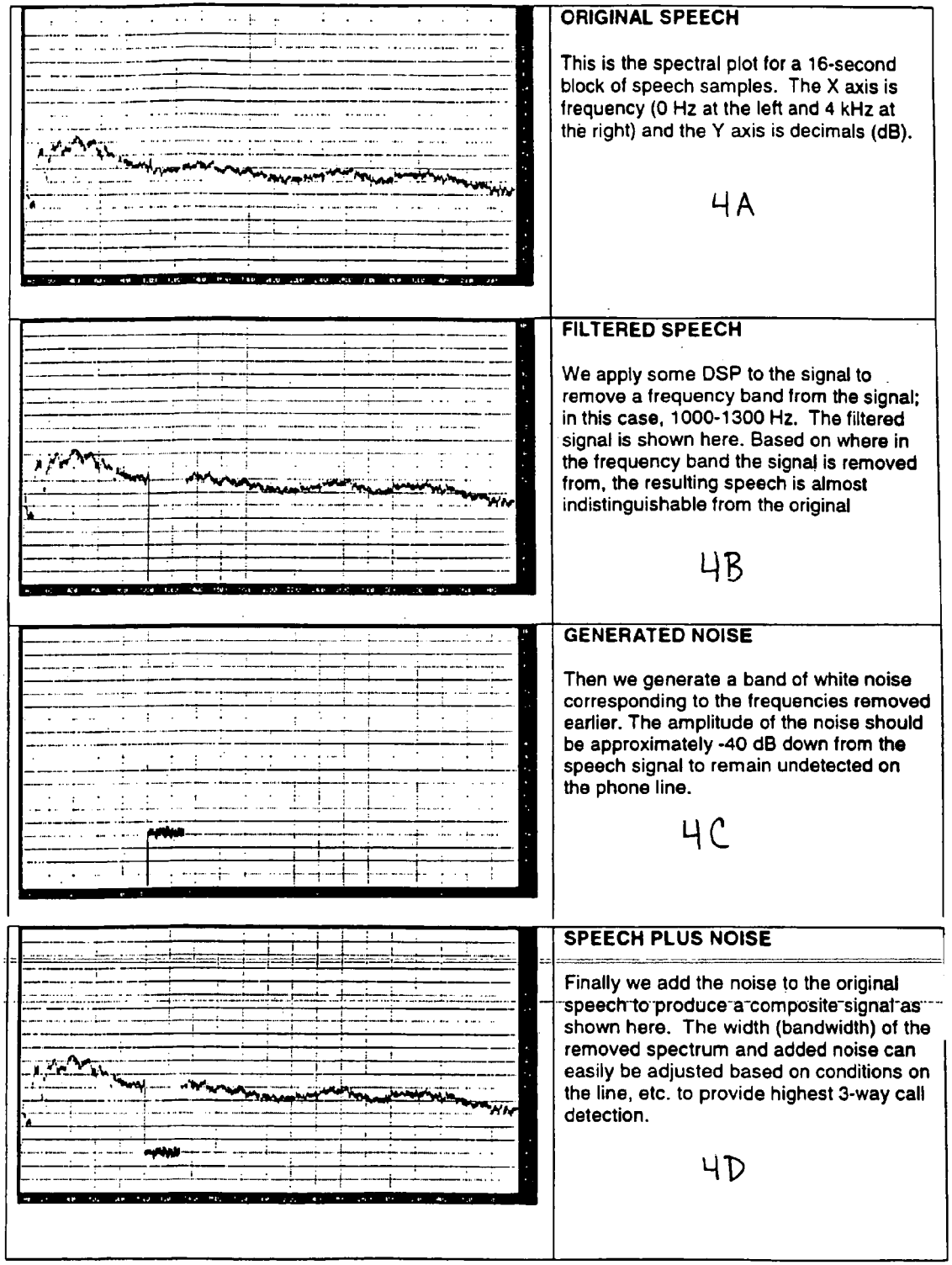
FIG. 4 is are spectral plots that show how one embodiment of the present system may be implemented.

FIG. 4 contains four spectral plots that help to illustrate a further embodiment of the present invention.

FIG. 4A is the spectral plot for a 16-second block of speech samples. The X axis is frequency (0 Hz at the left and 4 kHz at the right) and the Y axis is decibels (dB).

FIG. 4B shows how a portion of the frequency spectrum of the signal in FIG. 4A may be removed (for example, using DSP or a notch filter). In this case, the frequency band of 1000–1300 Hz. has been removed. The filtered signal is shown here. Depending on which frequencies are removed, the resulting audio speech may be almost indistinguishable from the original. In a preferred embodiment, a small group of frequencies (e.g., having a bandwidth of 300 Hz or less) are removed. Ideally, the bandwidth can be adjusted for each system in order to minimize the perceptibility of such frequencies that are removed.

FIG. 4C shows a band of white noise that corresponds to the frequencies removed earlier. The amplitude of the noise should be far enough down from the speech signal to remain undetected on the phone line. Preferably, the signal is at least 3 dB below the speech signal, and more preferably, 20 dB, and most preferably 40 dB.

FIG. 4D shows the resulting signal when the noise has been added to the filtered speech to produce a composite signal. One skilled in the art can adjust the width (bandwidth) of the removed spectrum and added noise based on conditions on the line and other conditions to provide the highest 3-way call detection rate.

FIGS. 5 and 6 show examples of three-way call detection using the above techniques for a call made between State College, Pa. and a small town in Northeast Ohio: FIG. 1. As can be seen, an initial baseline is established and then monitored for a significant change that is the result of the addition of a new party to the call. In FIG. 5, the signals being monitored are in the 1 kHz–2 kHz band, and in FIG. 6, the signals being monitored are in the 1 kHz–1.3 kHz band.

While the invention has been particularly shown and described in the foregoing detailed description, it will be understood by those skilled in the art that various other changes in form and detail may be made without departing from the spirit and scope of the invention. It is intended that the specification and examples be considered exemplary only, with the true scope and spirit of the invention indicated by the claims below.

What is claimed is:

1. A three way call detection system for detecting the addition of a third party to an pre-existing telephonic connection between a first party and a second party, said system comprising:

a meter for measuring the amplitude of a line voltage of a telephonic connection between a first party and a second party, said line voltage having a frequency band F1, a first filter to remove a frequency band F2 from said line voltage and output a filtered signal, said frequency band F2 being a subset of F1;

a white noise generator for generating a low level white noise signal with a frequency band that corresponds to F2 and with an amplitude that is measurably less than an amplitude level of the measured line voltage for frequency band F2, a coupler to combine the low level white noise signal with the filtered signal, thereby outputting an additive line voltage;

a second filter that passes at least a portion of the additive line voltage and substantially all of the low level white noise signal that was added, said signal that passes being referred to as the band-passed signal; and a processor for processing the band-passed signal and determining a baseline amplitude level associated with a two-way call;

wherein said processor monitors the band-passed signal in the time domain for a measurable shift in baseline amplitude level, which shift occurs when a third party is added to the telephonic connection.

2. The three way call detection system of claim 1, wherein the coupler is selected from the group consisting of: a voltage adder, a summer, a signal combiner, and a processor preprogrammed with a function that adds two signals to form a combined signal.

3. The three way call detection system of claim 1, wherein the coupler is a signal combiner.

4. The three way call detection system of claim 1, wherein the coupler is a processor preprogrammed with a function that adds two signals to form a combined signal.

5. The three way call detection system of claim 1, wherein the amplitude of the line voltage is measured at a location selected from the group consisting of: the location of the first party, a telephone switching station, and a telephone central office.

6. The three way call detection system of claim 1, wherein the amplitude of the line voltage is measured at a telephone switching station.

7. The three way call detection system of claim 1, wherein the amplitude of the line voltage is measured at a telephone central office.

8. The three way call detection system of claim 1, wherein the first filter is selected from the group consisting of: a notch filter, a band reject filter, a digital signal processor, and a circuit that subtracts signals in frequency band F2 from the amplitude of the line voltage in frequency band F1.

9. The three way call detection system of claim 1, wherein the first filter is a band reject filter.

10. The three way call detection system of claim 1, wherein the first filter is a digital signal processor that cancels signals within frequency band F2.

11. The three way call detection system of claim 1, wherein the first filter is a circuit that subtracts the amplitude signal in frequency band F2 from the amplitude of the line voltage in frequency band F1.

12. The three way call detection system of claim 1, wherein the second filter is selected from the group consisting of: a band pass filter, a digital signal processor, and a circuit that removes a band of frequencies from the line voltage.

13. The three way call detection system of claim 1, wherein the second filter is a band pass filter.

14. The three way call detection system of claim 1, wherein the second filter is a digital signal processor that cancels a band of frequencies.

15. The three way call detection system of claim 1, wherein the second filter is a circuit that removes a band of frequencies from the line voltage.

16. The three way call detection system of claim 1, wherein the white noise generator is selected from the group consisting of: a white noise source coupled to a bandpass filter; and a digital signal processor that generates a noise signal with a frequency band corresponding to F2.

17. The three way call detection system of claim 1, wherein the white noise generator is a white noise source coupled to a bandpass filter.

18. The three way call detection system of claim 1, wherein the white noise generator is a digital signal processor that generates noise with a frequency band corresponding to F2.

19. The three way call detection system of claim 1, wherein the meter is selected from the group consisting of: a voltmeter, a multimeter, and a measuring circuit.

20. A method of detecting the addition of a third party to an pre-existing telephonic connection between a first party and a second party, said method comprising:

measuring a line voltage for amplitude, said measured line voltage having a frequency band F1;

filtering the measured line voltage to remove a frequency band F2 to create a filtered signal, said frequency band F2 being a subset of frequency band F1;

generating a low level white noise signal with a frequency band that corresponds to F2 and with an amplitude that is less than an amplitude level of the measured line voltage for frequency band F2, adding the low level white noise signal to the filtered signal to create an additive line voltage;

filtering the additive line voltage to pass at least a portion of the additive line voltage and substantially all of the low level white noise that was added, said signal that passes being referred to as the band-passed signal;

processing the band-passed signal to determine a baseline amplitude level associated with the characteristics of a two-way call;

monitoring the band-passed signal in the time domain for a shift in baseline amplitude level, that occurs when a third party is added to the previous two-party call.

* * * * *